Dec. 31, 1957  C. E. STUMP  2,817,887
LIMB-HOLDER
Filed June 1, 1953
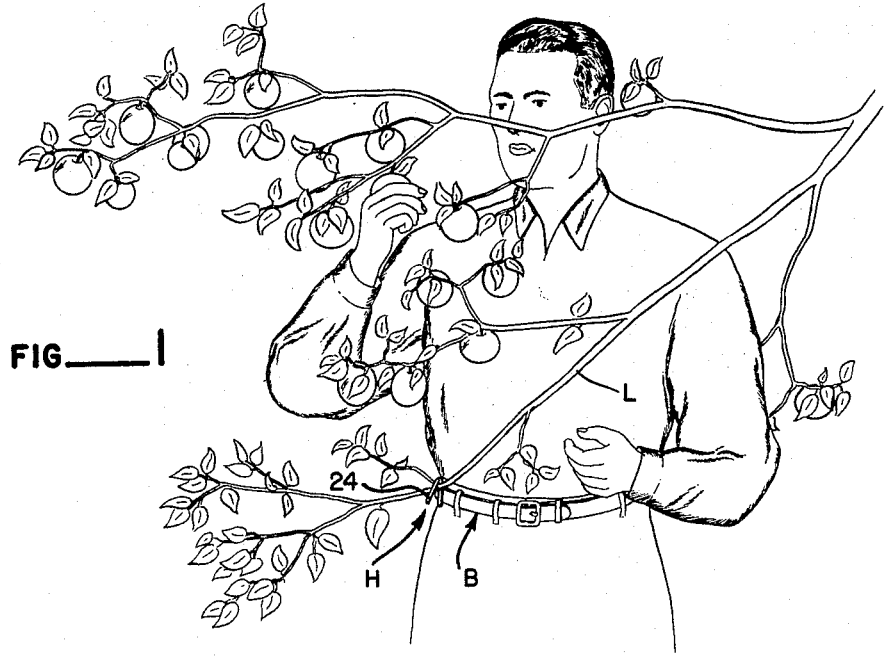
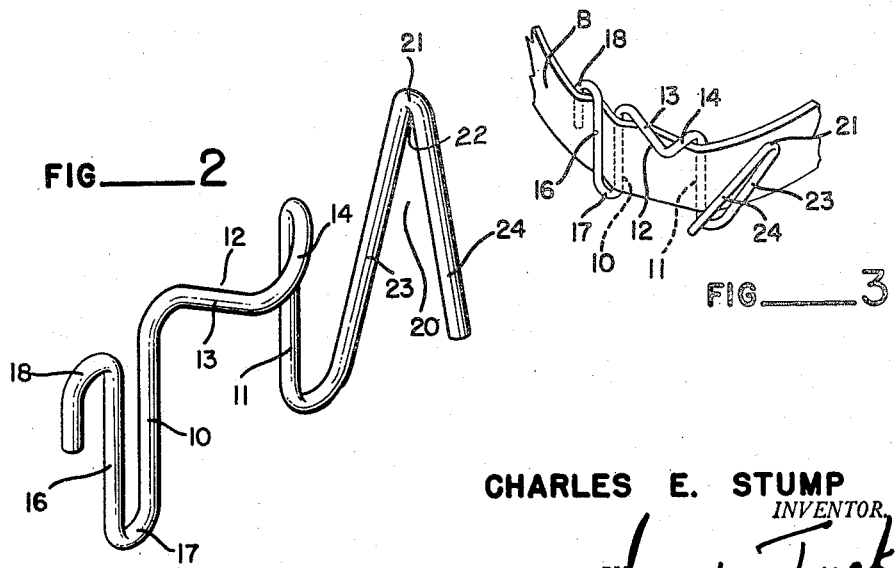
CHARLES E. STUMP
INVENTOR.
BY Smith + Tuck

United States Patent Office 2,817,887
Patented Dec. 31, 1957

2,817,887

LIMB-HOLDER

Charles E. Stump, Yakima, Wash.

Application June 1, 1953, Serial No. 358,843

1 Claim. (Cl. 24—73)

This invention relates to an improved limb-holder for use by fruit pickers, orchardists, and other persons who have occasions to manipulate the limbs and branches of shrubs and trees.

The chief purpose of this invention is to provide a limb-holder which may be quickly and easily removably attached to a person's trousers belt, or similar strap disposed at the waist of such a person, preferably near the hip at the side, so that a branch or limb may be secured to dispose its foliage and smaller branches immediately in front of the person and while leaving his arms entirely free to do whatever work he wishes such as, in the case of a fruit picker, thinning or picking fruit.

Another object of this invention is the provision of a limb-holder which is simply and easily formed of a single strand of wire, that is bent in a sinuous fashion for non-slidable engagement upon a trouser belt or the like and which has an integral limb or branch-holding fork associated therewith. Still another object is the provision of such a device that may be attached to and removed from such a belt without necessitating unbuckling the belt.

A still further object of the invention is in the provision of a limb-holder formed by bent wire which is extremely useful to fruit pickers and orchardists and other persons while they are working in a bush or tree but which is so arranged as to not interfere with the movement of the arms and which lessens accidental engagement with branches and limbs as such persons climb up and into trees and branches and their foliages.

These objects, together with other and additional objects and advantages which will appear from the specification, are accomplished by the limb-holder device hereinafter described in connection with the preferred embodiment as shown in the accompanying drawings, where:

Figure 1 is a perspective view showing a portion of a human figure of an orchardist or a fruit picker using my limb-holding device;

Figure 2 is an enlarged perspective view of the limb-holder; and

Figure 3 is a perspective view of the limb-holder as it appears when engaged upon the trousers belt or the like.

The invention comprises a body formed of heavy, stiff wire bent in a sinuous fashion to receive a trousers belt and having a limb-holding hook. Such a body includes a medial or intermediate portion generally of M-shape and comprising the first leg 10 and a second leg 11, both of which legs are coplanar with each other. The intermediate or connecting V portion 12 between the upper ends of legs 10 and 11 is disposed slightly in advance of the plane of legs 10 and 11 and extends downwardly a distance less than their length. The intermediate or connecting portion 12 comprises arms 13 and 14 which join each other rather bluntly between legs 10 and 11 and are slightly offset from their respective legs.

An upstanding stem 16 is joined to leg 10 by a relatively short U-bend 17 and is of a length comparable to leg 10 and is co-planar with legs 10 and 11. Stem 16 has upon its upper end a hook 18 which is integral with stem 16 in the same manner as stem 16 is integral with the leg 10.

The other leg of the M-shaped intermediate portion has attached thereto the V-shaped fork 20 which is inverted and has, near its apex, the progressively constricted throat 22. Fork 20 is formed by a pair of rigid bars 23 and 24 divergingly connected together at the apex 21 to form the limb-engaging throat 22. Hook or fork 20 is connected to the leg 11 in such a manner and relationship that, in general, it stands forward of a belt to which the device is attached with the bar 24 downwardly directed at an angle to the perpendicular. In Figure 1, wherein the holder device is indicated as a whole by the letter "H," the device is attached to the belt "B." A limb "L" has been engaged under the bar 24 and wedged into throat 22. In this manner the associated fruit on other stems of the same general branch is disposed directly in front of the user and both his arms are left free to speed and facilitate the fruit-picking operation.

Turning the attention to Figure 3, the device is there shown as it appears when mounted upon a trousers belt. To remove the same, that portion of the belt underlying the connecting V portion 12, of the intermediate or medial M-shaped part of the body, is distorted or forced downward and outward from underneath the bars 13 and 14. Downward pressure then applied upon the apex 21 of the inverted hook or fork 20 causes the connecting portion 12 to slide down behind the belt while the device pivots on the throat portion of hook 18. As the intermediate portion 12 of the wire body thus slips out from behind the belt, the hook 18 may be easily disengaged and the device then be removed. The re-engagement of the device on the belt is obtained in the reverse order which comprises disposing the hook 18 over the belt from forward rearwardly, and bringing the intermediate connecting portion up behind the belt close to the wearer's body, and finally by distorting the belt sufficiently to engage a portion of it under the connecting part of the wire body. It will be readily seen that attachment or detachment does not require that the belt be unbuckled.

While I have shown in the drawings such a device that is suitably arranged for use on the right side of a person's body, it will be apparent to those skilled in the art that the reverse form of the device will likewise be useful to the fruit picker's left side. My experience teaches me that one of these limb-holders at either hip is extremely practical and will accommodate branches from all directions.

An unusual and rather surprising effect that has been obtained by the use of this device is its assistance given to people working in trees to brace or stabilize their position. It is quite common on such occasions for a person to use a ladder which must be braced against the foliage. At best his supporting ladder sways and swings and is not a particularly stable support. By attaching a branch to the body in the manner indicated in Figure 1 it is found that a person more or less fastens himself to the tree which supports his ladder or other framework and his position is much steadier and he finds it considerably easier to maintain his balance and to go about his work without giving undue concern to his safety, all of the time having both hands free to work, or to grab, in the event that he needs to steady himself.

While I have shown here and described a preferred embodiment of my invention and the structural features and cooperative elements thereof, it is understood that changes and modifications as would be comprehended by one skilled in this art are contemplated and may be made within the scope of the subjoined claim.

Having thus described my invention, I claim:

A limb-holder for attachment to a waist belt of fruit pickers, orchardists and the like, comprising: a single formed wire having an M-shaped intermediate portion consisting of a first leg and a second leg joined at their upper ends by a V-shaped portion extending downward a distance less than the length of the legs and forward from a plane common to said legs, said first leg having connected to its lower end by a reverse joint an upstanding stem of a length comparable to the first leg and terminated at its upper end with a down-turned hook directed away from said first leg, said stem being disposed in the plane common to said legs, said second leg having joined to its lower end by a reverse joint an inverted V-shaped fork consisting of a pair of integral bars divergently connected together to form an apex constituting a limb engaging throat, said apex being arranged to stand forwardly of the plane defined by the first and second legs of the M-shaped intermediate portion, whereby the holder may be secured on a waist-belt with the latter engaged under said hook, behind said stem, in front of said legs, and behind and beneath said V-shaped connecting portion and behind said inverted form.

References Cited in the file of this patent

UNITED STATES PATENTS

| | | |
|---|---|---|
| 619,062 | Wittich | Feb. 7, 1899 |
| 723,130 | Boyles | Mar. 17, 1903 |
| 834,188 | Carr | Oct. 23, 1906 |
| 1,151,943 | Griffin | Aug. 31, 1915 |
| 1,472,766 | Fraser | Oct. 30, 1923 |
| 1,550,406 | Wilson | Aug. 18, 1923 |
| 1,588,751 | Landon | June 15, 1926 |
| 1,872,753 | Krebs | Aug. 23, 1932 |
| 1,898,781 | Leiter | Feb. 21, 1933 |
| 1,907,655 | Parris | May 9, 1933 |
| 2,530,324 | Bumbera et al. | Nov. 14, 1950 |